United States Patent

Zhu et al.

[11] Patent Number: 5,841,591
[45] Date of Patent: Nov. 24, 1998

[54] METHOD AND SYSTEM FOR ALIGNING A LENS AND A PIGTAIL

[75] Inventors: Steven Guoxin Zhu, Fremont; Yu Zheng, Sunnyvale, both of Calif.

[73] Assignee: Oplink Communications, Inc., San Jose, Calif.

[21] Appl. No.: 906,284

[22] Filed: Aug. 4, 1997

[51] Int. Cl.⁶ .............................. G02B 7/02; G02B 6/36
[52] U.S. Cl. .............................................. 359/819; 385/76
[58] Field of Search .................................. 359/819, 811; 385/76, 77, 78, 79, 80, 88

[56] References Cited

U.S. PATENT DOCUMENTS

| | | | |
|---|---|---|---|
| 4,652,123 | 3/1987 | Neumann | 356/73.1 |
| 4,810,053 | 3/1989 | Woith | 385/79 |
| 5,146,526 | 9/1992 | Sweeney et al. | 385/90 |
| 5,278,929 | 1/1994 | Tanisawa et al. | 385/93 |
| 5,440,462 | 8/1995 | Kim et al. | 362/105 |
| 5,487,124 | 1/1996 | Bowen et al. | 385/93 |
| 5,588,077 | 12/1996 | Woodside | 385/26 |

Primary Examiner—Georgia Y. Epps
Assistant Examiner—Ricky Mack
Attorney, Agent, or Firm—Sawyer & Associates

[57] ABSTRACT

A system and method for providing an optical collimator is disclosed. The collimator includes a lens, a pigtail, and a holder. The method and system include aligning the lens and the pigtail, affixing a position of the lens with respect to a position of the pigtail, and placing the lens and the pigtail in the holder. The alignment is carried out in three dimensions.

18 Claims, 2 Drawing Sheets

METHOD AND SYSTEM FOR ALIGNING A LENS AND A PIGTAIL

FIELD OF THE INVENTION

The present invention relates to a method and system for providing an optical collimator and more particularly to a method and system for providing a reduced sized collimator having decreased losses.

BACKGROUND OF THE INVENTION

Conventional optical collimators are typically composed of a pigtail, to which an input fiber is attached, a graduated index of refraction ("GRIN") lens for collimating the light, and a holder. As an optical signal passes through the collimator, there is some loss in intensity. It is desirable to minimize the loss in intensity through the collimator.

The losses in signal intensity may be due to many factors. For example, when the axis of the holder is not straight, or the inside surface of the holder is rough, precise alignment between the GRIN lens and the pigtail may be difficult to achieve. Such misalignments will greatly increase losses.

In addition to low losses, other properties of collimators may be desirable. In certain applications, for example, size may be a consideration. For such applications, therefore, a smaller collimator is desired.

Accordingly, what is needed is a system and method for providing a small collimator having low losses. The present invention addresses such a need.

SUMMARY OF THE INVENTION

The present invention provides a method and system for providing an optical collimator. The collimator includes a lens, a pigtail, and a holder. The method and system comprise aligning the lens and the pigtail, affixing a position of the lens with respect to a position of the pigtail, and placing the lens and the pigtail in the holder. The alignment is carried out in three dimensions.

According to the system and method disclosed herein, the present invention provides a mini-collimator having lower losses, thereby increasing overall system performance.

DETAILED DESCRIPTION OF THE INVENTION

The present invention relates to an improvement in optical collimators. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Conventional collimators are typically composed of a pigtail, a GRIN lens for collimating the light, and a holder. Loss in signal intensity is an important consideration in collimator behavior. A collimator should minimize the loss in signal intensity through the collimator.

Often, losses in intensity through the collimator are due to the holder. When the axis of the holder is not straight enough, or when the inside surface of the holder is rough, it is difficult to precisely align the GRIN lens and the pigtail. Losses will, therefore, increase. In addition, collimator size may be a consideration for certain applications. For such applications, therefore, it is desirable to have a collimator having a smaller diameter.

Figure 1:
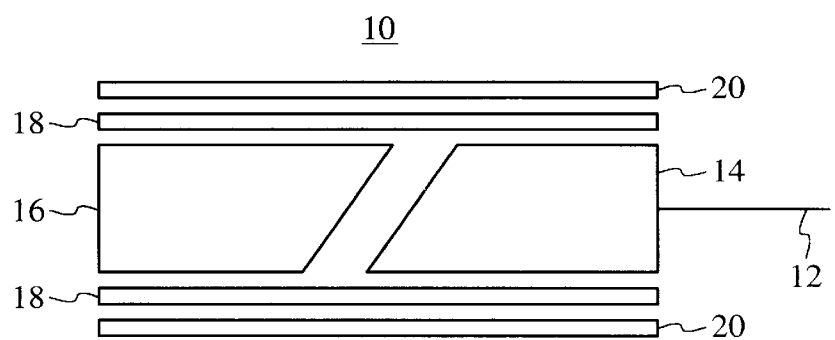
FIG. 1 is a block diagram of a lower loss collimator.

FIG. 1 is a block diagram of a collimator 10 in accordance with the above-mentioned co-pending application. Briefly, the collimator 10 includes a quartz holder 18, a stainless steel holder 20, a GRIN lens 16, a pigtail 14, and an input fiber 12. Because the accuracy of machining is limited, the inside surface of the stainless steel holder 20 may be rough. For the same reason, the axis of stainless steel holder 20 may not be straight. Because the quartz holder has a smooth, clean inside surface as well as an extremely straight axis, the quartz holder improves the losses over conventional collimators.

In order to manufacture the collimator 10, the GRIN lens 16 is first affixed to the inside of the quartz holder 18. The pigtail 14 is then aligned to the GRIN lens 16. In order to align the pigtail 14, the distance between the pigtail 14 and the GRIN lens 16 is varied. Where the light from the fiber 12 enters the lens at the focal point of the GRIN lens, the light signal output from the GRIN lens 16 is parallel. Where the light signal output from the GRIN lens 16 is parallel, the GRIN lens and the pigtail 14 are aligned. Once alignment is complete, the pigtail is affixed to the quartz holder 18.

Although the collimator 10 functions well for the purposes for which it was designed, one of ordinary skill in the art will realize that it is also desirable to reduce the size of the collimator 10. One of ordinary skill in the art will also realize that it is also desirable to minimize the losses of a small collimator. If the stainless steel holder 20 is removed, it will be extremely difficult to solder to the collimator 10. If the quartz holder 18 was removed, the collimator 10 would have losses similar to conventional collimators.

The present invention provides for a method and system for providing mini-collimator having lower losses. The present invention will be described in terms of a collimator including a GRIN lens and pigtail. However, one of ordinary skill in the art will readily recognize that this method and system will operate effectively for other types of collimating lenses and other components.

Figure 2:
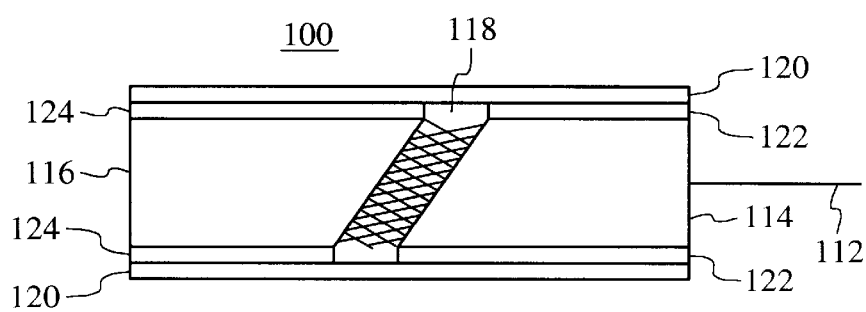
FIG. 2 is a block diagram of a low loss mini-collimator in accordance with the method and system.

To more particularly illustrate the method and system in accordance with the present invention, refer now to FIG. 2 depicting a block diagram of one embodiment of such a system. The mini-collimator 100 contains a stainless steel holder 120, a pigtail 114, a GRIN lens 126, and epoxy sections 118, 122 and 124. The Pigtail 114 is connected to an optical fiber 112 for inputting an optical signal.

Despite the fact that the stainless steel holder 120 may have a rough inside surface and a central axis that deviates from being straight, the mini-collimator 100 has precise alignment and, therefore, low losses. In addition, because there is only a stainless steel holder 120, the mini-collimator 100 is very compact. Finally, because the stainless steel holder 120 is used, soldering to the mini-collimator 100 is simplified. In a preferred embodiment, a gold plated stainless steel holder is used to further facilitate soldering.

Figure 4:
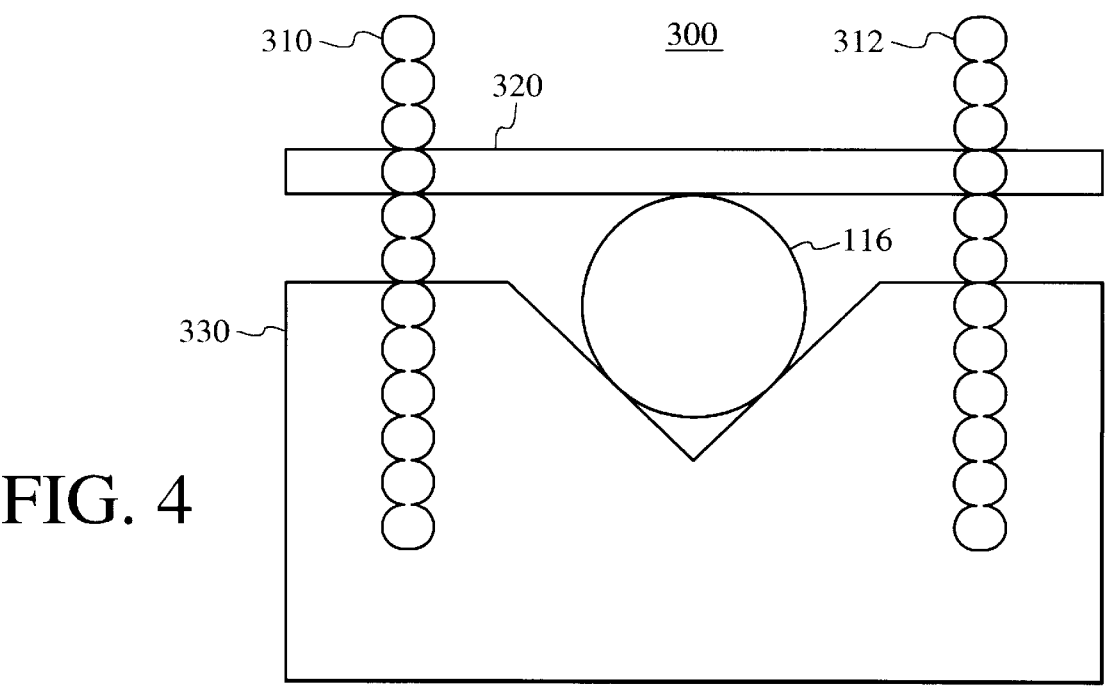
FIG. 4 is a block diagram of a fixture holding a GRIN lens for use in the method and system.
Figure 3:
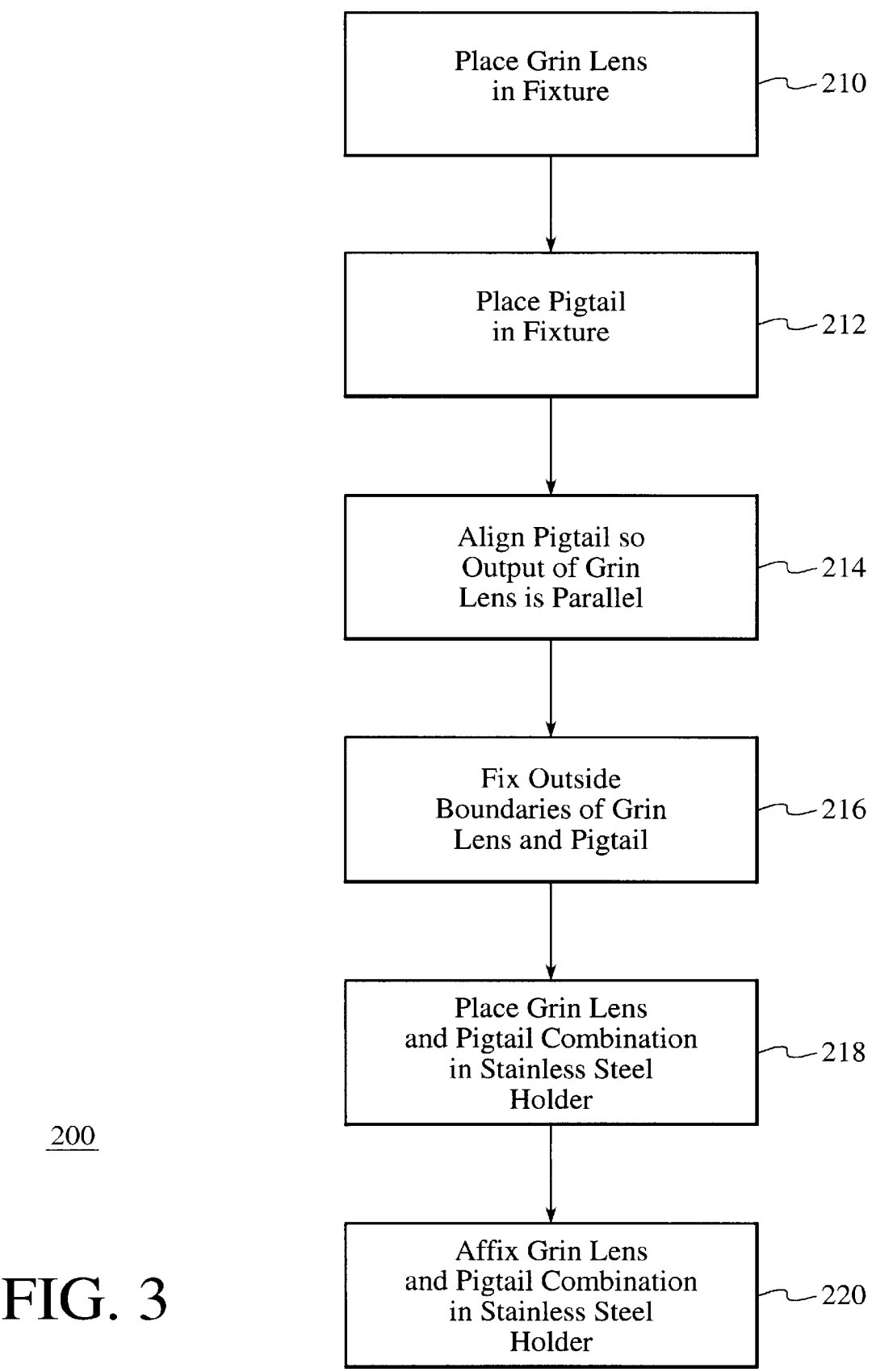
FIG. 3 is a flow chart depicting one method for providing a mini-collimator in accordance with the method and system.

FIG. 3 depicts one embodiment of a method to provide the mini-collimator 100 in accordance with the method and system. First, the GRIN lens 116 is placed in a fixture via step 210. A block diagram of one embodiment of such a fixture 300 is shown in FIG. 4. The fixture 300 includes holding screws 310 for clamping plate 320 onto the GRIN lens 116. The GRIN lens 116 sits in a grove in the base 330 of the fixture 300. Consequently, the GRIN lens 116 is firmly held in place.

Referring back to FIG. 3, the pigtail 114 is also placed into a fixture via step 212. The fixture in which the pigtail 114 is placed is substantially the same as the fixture 300. Consequently, step 212 may include placing the pigtail 114 in the groove in the base 330 and holding the pigtail 114 in place by the clamping the plate 320 onto the pigtail 114. Next, via step 214, the pigtail 114 is aligned to the GRIN lens 116. Preferably, the pigtail 114 is aligned to the GRIN lens 116 so that the output of the GRIN lens 116 is parallel.

Because the pigtail 114 and the GRIN lens 116 are each in fixtures, rather than being constrained by a holder, there is greater freedom of movement between the GRIN lens 116 and the pigtail 114. In a preferred embodiment, the pigtail 114, the GRIN lens 116, and their respective fixtures are placed on an alignment bench, not shown. The alignment bench allows each fixture to be moved very precise both horizontally and vertically. As result, during the aligning step 214, the pigtail 114 can be moved in three dimensions. As the position of the pigtail 114 is varied, the output of the GRIN lens 116 is monitored. When the output of the GRIN lens 116 is parallel, the alignment process is complete.

Next, the position of the GRIN lens 116 and pigtail 114 are fixed with respect to each other, via step 216. In a preferred embodiment, step 216 is performed by fixing the outside boundaries of the GRIN lens 116 and pigtail 114 with epoxy. In a preferred embodiment, the epoxy used is OZ 154 manufactured by EPOXY TECHNOLOGIES. Thus, epoxy section 118 is provided.

Via step 218 the combination of the GRIN lens 116 and pigtail 114 are removed from the fixtures and placed in the stainless steel holder 120. The process is completed by affixing the combination of the GRIN lens 116 and the pigtail 114 to the stainless steel holder 120 via step 220. In addition, any spaces between the GRIN lens 116-pigtail 114 combination and the stainless steel holder 120 are filled in with epoxy 353ND manufactured by EPOXY TECHNOLOGIES. Thus, epoxy sections 122 and 124 are provided.

Because the alignment between the GRIN lens 116 and the pigtail 114 is very precise, the losses in the mini-collimator 100 are minimized. In addition, the removal of the quartz holder allows the reduced size of the mini-collimator 100. A method and system has been disclosed for a mini-collimator having precise alignment and, therefore, lower losses.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a collimator, the collimator including a lens, a pigtail, and a holder, the method comprising the steps of:
    a) aligning the lens and the pigtail, the alignment being carried out in three dimensions;
    b) affixing a position of the lens with respect to a position of the pigtail after the lens and the pigtail are aligned in step (a); and
    c) placing the lens and the pigtail in the holder after the lens and the pigtail are aligned in step (a).

2. The method of claim 1 wherein aligning step (a) further comprises the step of:
    monitoring an output of the lens.

3. The method of claim 2 wherein affixing step (b) further comprises:
    (b1) affixing the position of the lens with respect to the position of the pigtail where the output of the lens is substantially parallel.

4. The method of claim 3 wherein aligning step (a) further comprises the steps of:
    placing the lens in a first fixture; and
    placing the pigtail in a second fixture.

5. The method of claim 4 wherein the affixing step (b) further comprises the step of:
    (b2) affixing the position of the lens with respect to the position of the pigtail with an epoxy.

6. The method of claim 5 further comprising the step of:
    (d) affixing the lens and the pigtail to the holder.

7. The method of claim 6 wherein the lens is a graduated index of refraction lens.

8. The method of claim 7 wherein the holder affixing step (d) further comprises the step of:
    (d1) affixing the lens and the pigtail to the holder with the epoxy.

9. The method of claim 8 wherein the holder is a stainless steel holder.

10. A system for providing a collimator, the collimator including a lens, a pigtail, and a holder, the system comprising:
    means for aligning the lens and the pigtail, the alignment being carried out in three dimensions;
    means for affixing a position of the lens with respect to a position of the pigtail after the lens and the pigtail are aligned; and
    means for placing the lens and pigtail in the holder after the lens and the pigtail are aligned.

11. The system of claim 10 wherein the aligning means further comprise:
    means for monitoring an output of the lens.

12. The system of claim 11 wherein the affixing means further comprises:
    means for affixing the position of the lens with respect to the position of the pigtail such that the output of the lens is substantially parallel.

13. The system of claim 12 wherein the aligning means further comprise:
    a first fixture for holding the lens; and
    a second fixture for holding the pigtail.

14. The system of claim 13 wherein the affixing step means further comprise:
    means for affixing the position of the lens with respect to the position of the pigtail with an epoxy.

15. The system of claim 14 further comprising:
    means for affixing the lens and the pigtail to the holder.

16. The system of claim 15 wherein the lens is a graduated index of refraction lens.

17. The system of claim 16 wherein the holder affixing means further comprise:
    means for affixing the lens and the pigtail to the holder with the epoxy.

18. The system of claim 14 wherein the holder further comprises a stainless steel holder.

* * * * *